Nov. 8, 1927.  
G. GUTIERREZ R  
VALVE MECHANISM  
Filed Nov. 15, 1924

1,648,766

Inventor—
Gilberto Gutierrez R
by his Attorneys—
Howson & Howson.

Patented Nov. 8, 1927.

1,648,766

UNITED STATES PATENT OFFICE.

GILBERTO GUTIERREZ R., OF MEXICO, MEXICO.

VALVE MECHANISM.

Application filed November 15, 1924, Serial No. 750,119, and in Mexico July 7, 1924.

My invention relates to valves, and it has for one object to provide a valve of compact and rugged design which shall operate periodically to cause the discharge of a predetermined quantity of water from a receptacle.

Another object of my invention is to provide a valve of the class described, wherein the rate of periodic operation may be easily and efficiently controlled.

A further object of my invention is to provide an automatic valve, which shall be adaptable to existing sanitary installations, wherein a predetermined charge of water is to be periodically discharged from a receptacle.

A still further object of my invention is to provide an automatic valve, which shall be adapted for quantity production methods of manufacture, the several parts of which may be readily made on existing machinery and assembled with a minimum expenditure of time and of money.

With these and other objects and applications in mind, my invention further consists in the details of construction and operation and arrangement, hereinafter set forth in the accompanying description, claims and drawing, wherein Fig. 1 is a vertical sectional view of one form of embodiment of my invention, with the valve in the open position;

Figure 2:
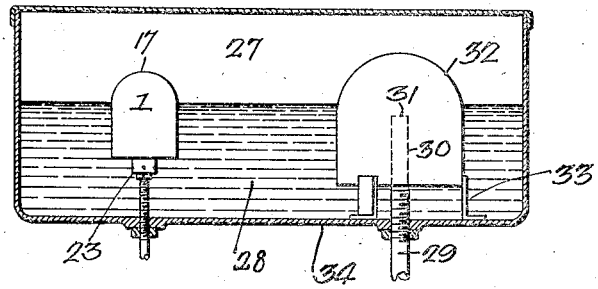
Fig. 2 is a view, partially in section and partially in elevation, of one application of my invention.
Figure 1:
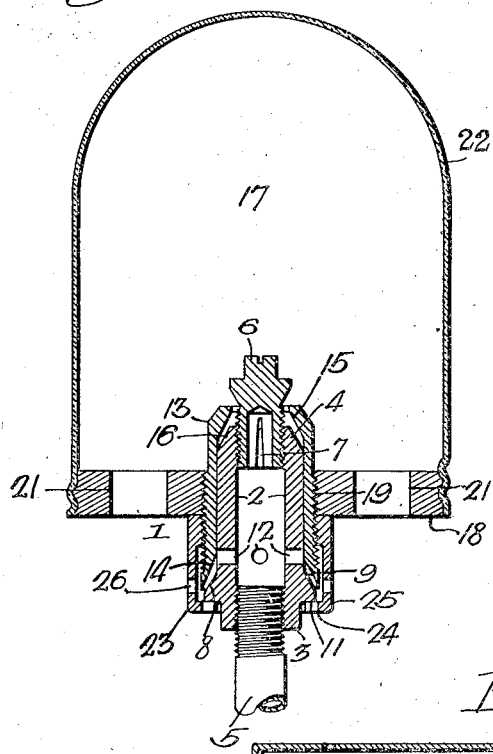

In the illustrated form of embodiment of my invention shown in Figs. 1 and 2, a valve 1 comprises a vertically extending tubular element 2 having internally threaded lower and upper end portions 3 and 4 respectively associated with a supply pipe 5 and a plug element 6. The supply pipe 5 communicates with a source of fluid (not shown). The plug element 6 has a recess or groove 7 formed in the threaded surface thereof so as to provide an outlet passage from the tubular element 2. The dimensions of the outlet passage 7, and, hence, the rate of flow of the fluid therethrough, may be adjusted by moving the threaded plug element 6 into or out of the threaded end 4 of the element 2. The importance of the variable outlet passage 7 thus formed will appear more fully hereinafter.

The lower end of the tubular element 2 is provided with an enlarged conical portion 8 forming a valve seat 9 and an annular shoulder 11. The portion of the element 2 intermediate the valve seat 9 and the adjustable plug 6 is provided with a plurality of radially extending perforations 12 communicating with the supply pipe 5, and these perforations 12 constitute the main outlet openings of the valve 1.

The outlet passages 12 may be closed by means of a vertically movable sleeve 13, a lower end portion of which is provided with a conical surface 14 constituting a valve disk for the valve seat 9. An upper end of the sleeve 13 is provided with a conical surface 15 adapted to engage a complementary surface 16 on the adjacent end of the element 2 when the valve is closed, that is, when the conical surfaces 9 and 14 are in engagement.

The sleeve 13 may be actuated to open and to close the valve 1 by means of a float 17 of any well known design. The particular form of float shown in the drawing comprises a circular base member 18 which is in threaded engagement with a portion 19 of the vertically movable sleeve 13. The base member 18 may be provided with perforations 21, whereby the fluid passing through the passage 7 of the plug 6 may escape from the float 17. A casing 22 has a lower open end secured in threaded engagement to the base member 18 so that air may be trapped in the closed end thereof, all as will appear more fully hereinafter.

The extent of vertical movement of the sleeve 13 may be adjustably controlled by means of a tubular cap 23, which has an upper portion thereof in threaded engagement with the sleeve 13 and a lower flanged portion 24 positioned to engage the annular shoulder 11. The flanged portion 24, as well as an adjacent side portion 25 of the cap 23, is provided with perforations 26, permitting the passage of fluid from the valve 1 when the sleeve 13 has been moved to disengage the lower conical surfaces 9 and 14.

In order to illustrate the operation of my invention, I have shown in Fig. 2 the valve 1 associated with a receptacle 27 containing a fluid 28, the level of which is such as to cause the valve 1 to assume the open position shown in Fig. 1. In this position, the fluid in the supply pipe 5 is permitted to discharge through the valve passages 12, and 26 into the receptacle 27. The fluid thus supplied to the receptacle 27 may be discharged therefrom through a siphon 29 which is effective only when the valve 1 is in said open position. The siphon 29 comprises a pipe 30, an end 31 of which projects up into the receptacle 27 and is partially surrounded by means of a cover 32 supported by brackets 33 on the base 34 of the receptacle 27. The discharge pipe 30 of the siphon 29 is preferably larger than the supply pipe 5 in order that the level of the fluid 28 in the receptacle 27 may fall rapidly while the valve 1 remains open.

In operation, assuming the valve 1 open and the siphon 29 effective to discharge fluid from the receptacle 27, as shown in Fig. 1, the level of the fluid falls rapidly. As the level of the fluid falls, the valve disk 14 moves into engagement with the valve seat 9, and thereby closing the outlet passages 12 and thereby preventing a further discharge of fluid therefrom into the receptacle 27. The fluid, however, continues to discharge from the receptacle 27 until the siphon 29 becomes ineffective.

The valve 1 now remains closed until sufficient fluid has leaked through the groove 7 of the adjustable plug 6 to raise the level of the fluid in the receptacle 27 to the point where the valve opens and the siphon 29 again becomes effective, whereupon a second discharge of fluid from the receptacle 27 occurs. Hence, it is apparent that the valve 1 causes a periodic discharge of fluid from the receptacle 27 through the siphon 29 and that the period between successive discharges may be controlled by means of the plug 6.

Figure 3:
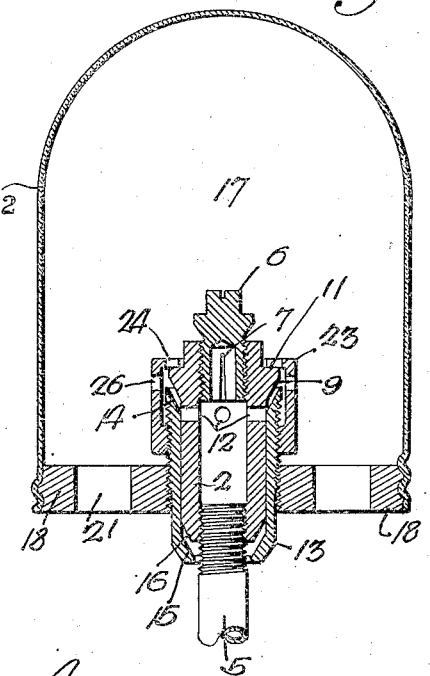
Fig. 3 is a view similar to Fig. 1, but showing certain parts of my valve rearranged so as to permit of another application.
Figure 4:
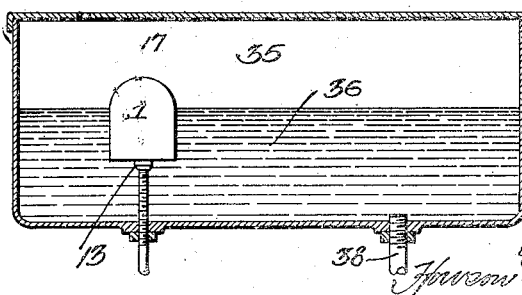
Fig. 4 is a view similar to Fig. 2, but further illustrating the alternate application of the valve of Fig. 3.

A further application of my invention is shown in Figs. 3 and 4, wherein the valve parts of Fig. 1 are so rearranged as to permit their use in a receptacle 35 containing a fluid 36 which is to be maintained at a predetermined level. Referring more especially to Fig. 3, it is apparent that the structure therein disclosed differentiates over that of Fig. 1 in the fact that the valve parts 2, 13 and 23 are inverted with respect to the float base 18 and also in fact that the plug 6 and the supply pipe 5 are oppositely disposed with respect to ends of the tubular element 2. In the present instance, the plug 6 is screwed tightly in position so as to prevent the passage of fluid through the passage 7 thereof.

In operation, assuming the level of the fluid 36 sufficiently low so that the valve disk 14 is disengaged from the valve seat 9, the outlet passages 12 are opened, permitting fluid to pass from the supply pipe 5 though the passages 12 and 26 into the receptacle 35. The fluid 36 continues to rise until it has reached the desired level at which time the float 17 causes the closing of the passages 12. When fluid is removed from the receptacle 35 through a discharge pipe 38, the valve 1 is again actuated into the open position shown in Fig. 3 and the foregoing cycle repeated.

While I have shown only two forms of embodiment of my invention, for the purpose of describing the same and illustrating its principles of construction and of operation, it is apparent that various changes and modifications may be made therein without departing from the spirit of my invention, and, I desire, therefore, that only such limitations shall be imposed thereon, as are indicated in the appended claims or as are demanded by the prior art.

I claim:

1. A valve comprising a tubular element having one end associated with a supply pipe, a plug for the other end of said element providing an adjustable outlet therefor, the outer surface of said element adjacent to one end being conical in form, a portion of said element intermediate the latter end and said plug having a perforation, a sleeve for said tubular element having a conical end portion adapted to co-act with the conical surface portion of said element, a member secured to said sleeve and adapted to engage said element when said sleeve is moved a predetermined distance, said member being adjustable to very the extent of movement thereof, and a float operatively associated with said sleeve.

2. A valve comprising a tubular element, a supply pipe and a plug respectively associated with the opposite ends thereof, said plug having a recess providing an adjustable outlet opening, one end of said element having a conical surface portion provding an annular shoulder, a portion of said element intermediate said conical portion and said plug being provided with a plurality of perforations, the end of said element adjacent to said plug having an inwardly extending conical surface, a sleeve for said element having conical surface portions adapted to co-act with the conical surface portions of said element, respectively, a cap member in threaded engagement with said sleeve and provided with a flange adapted to engage said annular shoulder when said co-acting conical surface portions have moved out of engagement a predetermined extent, said cap having perforations positioned to communicate with the perforations in said element when said cooperating conical surface portions are disengaged, a perforated base member in threaded engagement with said sleeve, and a casing having an open end in threaded engagement with said base member.

3. A valve comprising a tubular element having a plug providing an adjustable outlet, one end of said element having a conical surface portion providing a shoulder, a portion of said element intermediate said conical portion and said plug being perforated, the portion of said element adjacent to said plug having an inwardly extending conical surface, a sleeve for said element having conical end portions adapted to co-act with the conical surface portions of said element, respetcively, and a cap adjustably secured to said sleeve and provided with a flange adapted to engage said shoulder when said co-acting conical surface portions have moved out of engagement to a predetermined extent, said cap being provided with perforations positioned to communicate with the perforations in said element when said co-acting conical surface portions are disengaged.

G. GUTIERREZ R.